March 23, 1954
F. M. WAGNON
2,672,719
COTTON HARVESTER WITH CLEANING MEANS
Filed Oct. 4, 1951
4 Sheets-Sheet 3
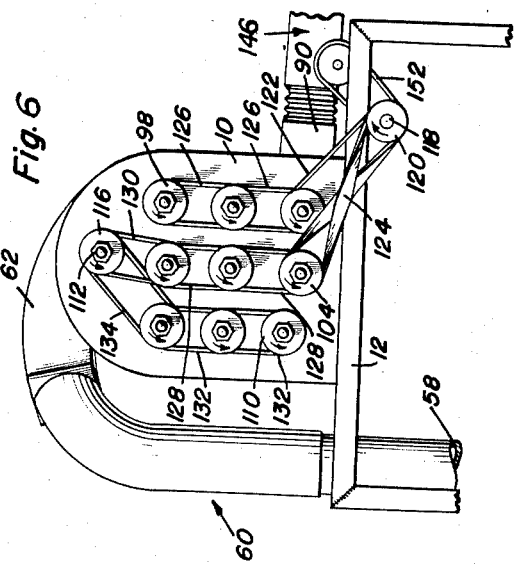
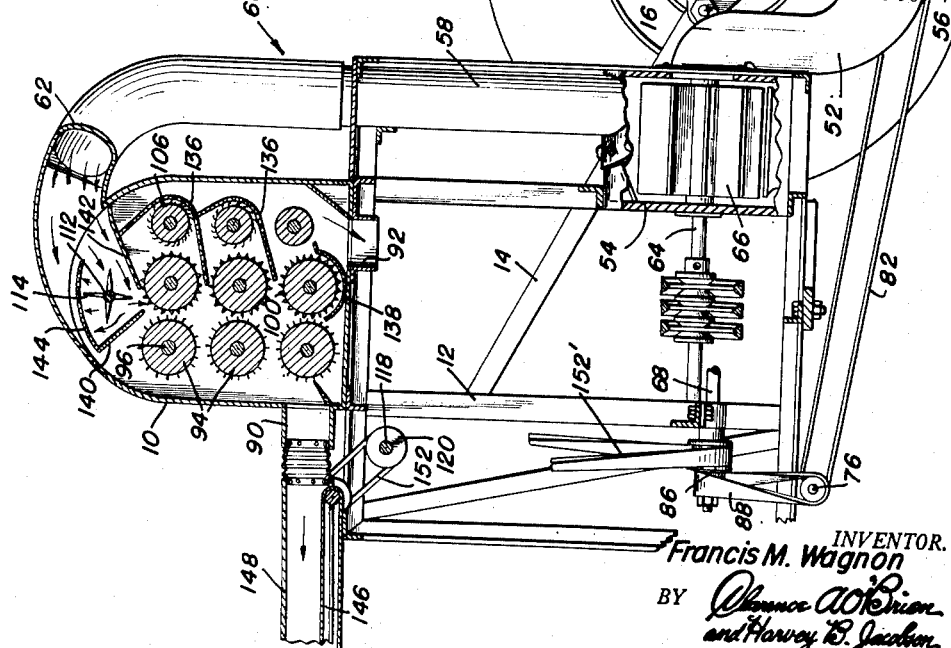
INVENTOR.
Francis M. Wagnon
BY Clarence A. O'Brien
and Harvey B. Jacobson
Attorneys March 23, 1954

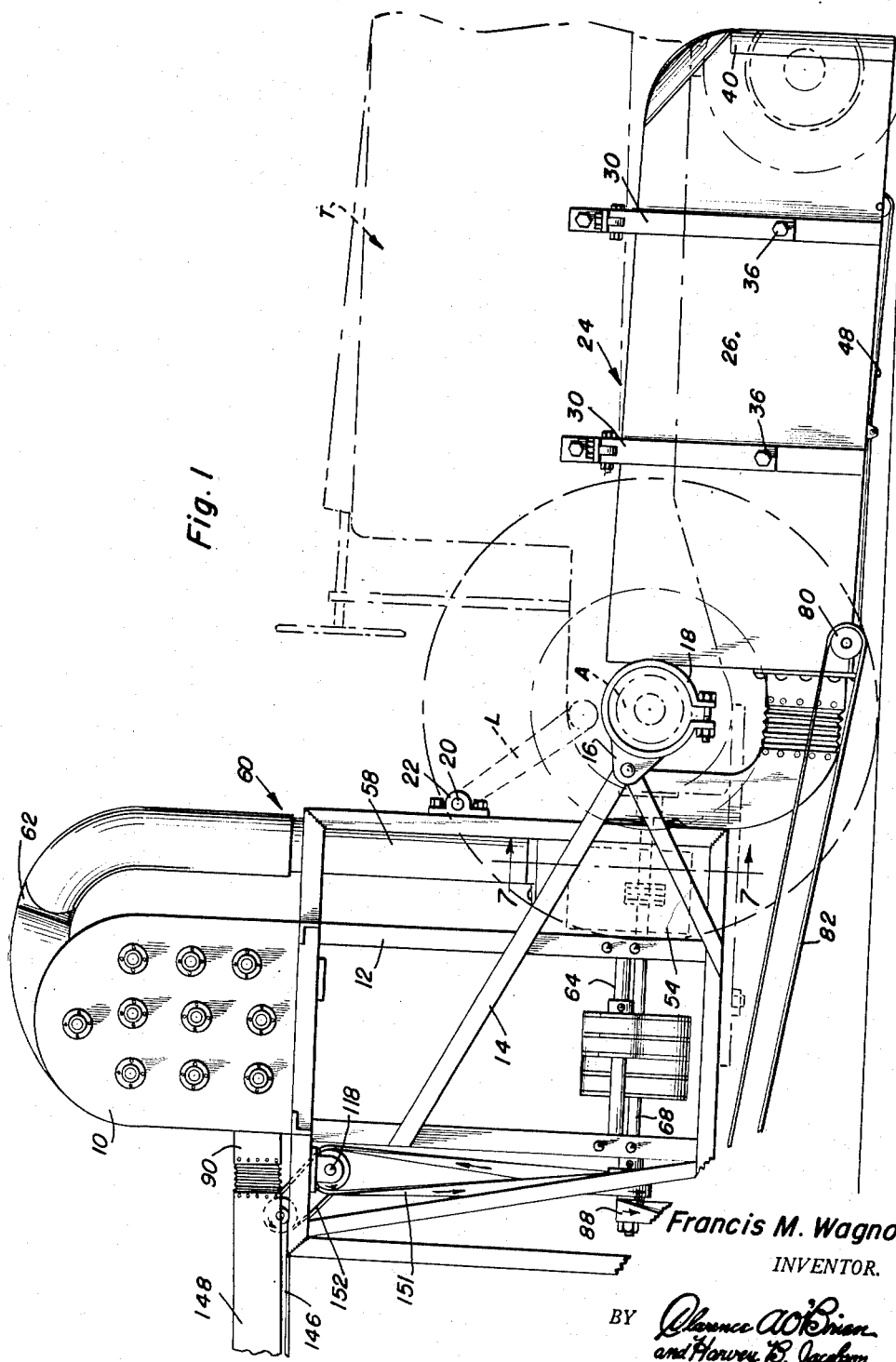

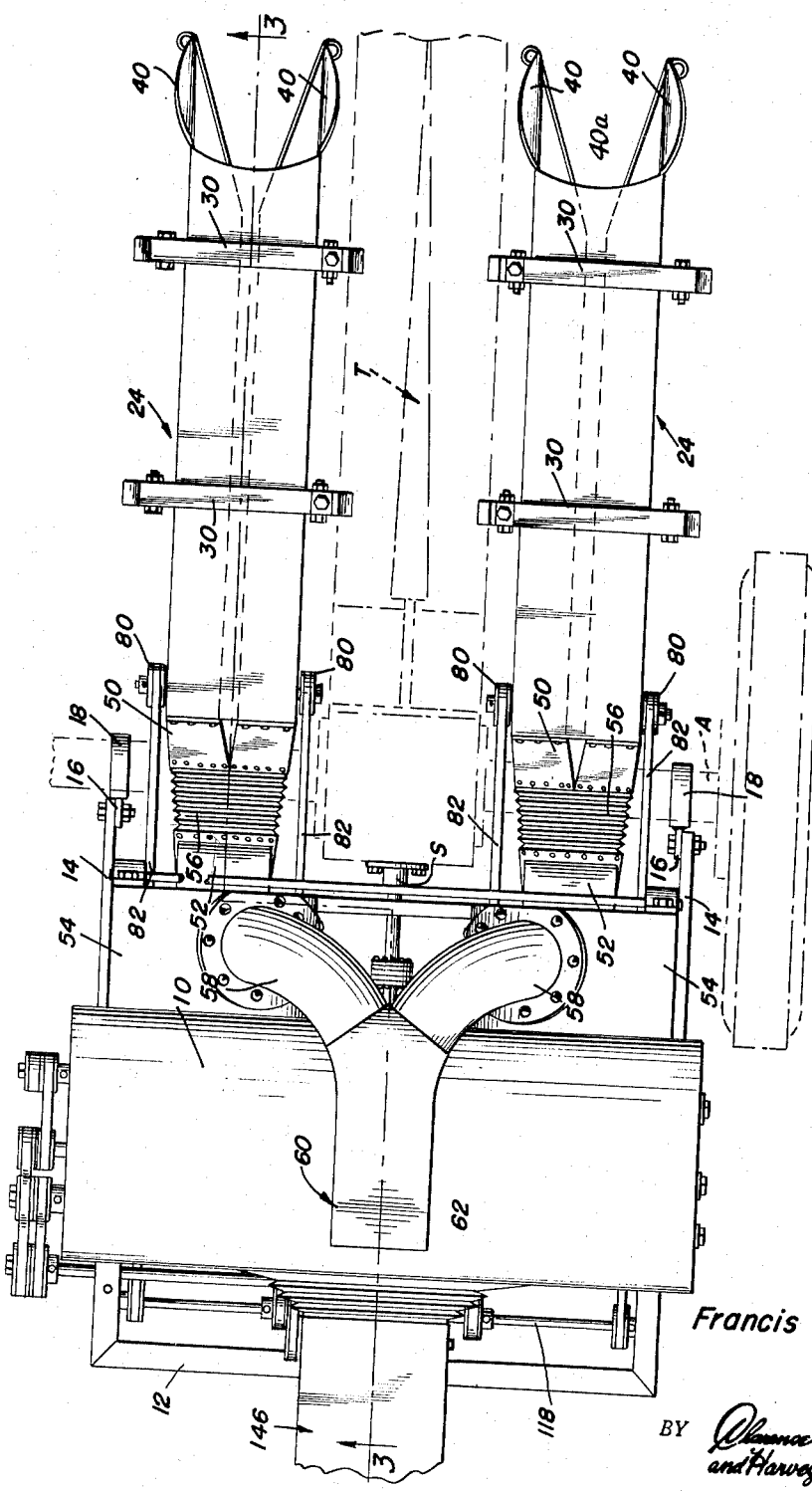

F. M. WAGNON 2,672,719

COTTON HARVESTER WITH CLEANING MEANS

Filed Oct. 4, 1951

Francis M. Wagnon
INVENTOR.

BY *Clarence A. O'Brien*
*and Harvey B. Jackson*
Attorneys

Patented Mar. 23, 1954

2,672,719

UNITED STATES PATENT OFFICE 2,672,719

COTTON HARVESTER WITH CLEANING MEANS

Francis M. Wagnon, Altus, Okla., assignor of one-tenth to Robert B. Perkins and three-tenths to James M. Sturdevant, both of Altus, Okla.

Application October 4, 1951, Serial No. 249,721

7 Claims. (Cl. 56—30)

This invention relates to new and useful improvements in cotton harvesters and the primary object of the present invention is to provide a cotton harvesting attachment for tractors that is so constructed as to strip the cotton from cotton plants and which will also separate the cotton from the trash and burrs, whereby cotton dispensed from the attachment will be soft and fluffy.

Another important object of the present invention is to provide a cotton harvester that is quickly and readily applied to or removed from a tractor in a convenient manner.

Yet another object of the present invention is to provide a cotton harvester including a pair of side by side trough members that are mountable on the sides of a tractor and which trough members include spaced side walls that are adjustably connected to vary the width of the trough members in accordance with the rows of cotton plants.

A further object of the present invention is to provide a cotton harvester that is adapted to be mounted on a tractor and wherein the trough members house longitudinal endless conveyors, driven by the power take off shaft of the tractor supporting the harvester, that will convey cotton bolls toward an air impeller, whereby the impeller will then direct the bolls to a housing member having cleaning and trash separating means therein.

A still further aim of the present invention is to provide a cotton harvester of the aforementioned character that is simple and practical in construction, strong and reliable in use, small and compact in structure, inexpensive to manufacture, install and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention supported on a tractor (shown by dotted lines);

Figure 2 is a top plan view of Figure 1;

Figure 3 is a longitudinal vertical sectional view taken substantially on the plane of broken section line 3—3 of Figure 2;

Figure 6 is a fragmentary side view of the invention taken substantially in the direction of arrow 8 in Figure 4.

Figure 4:
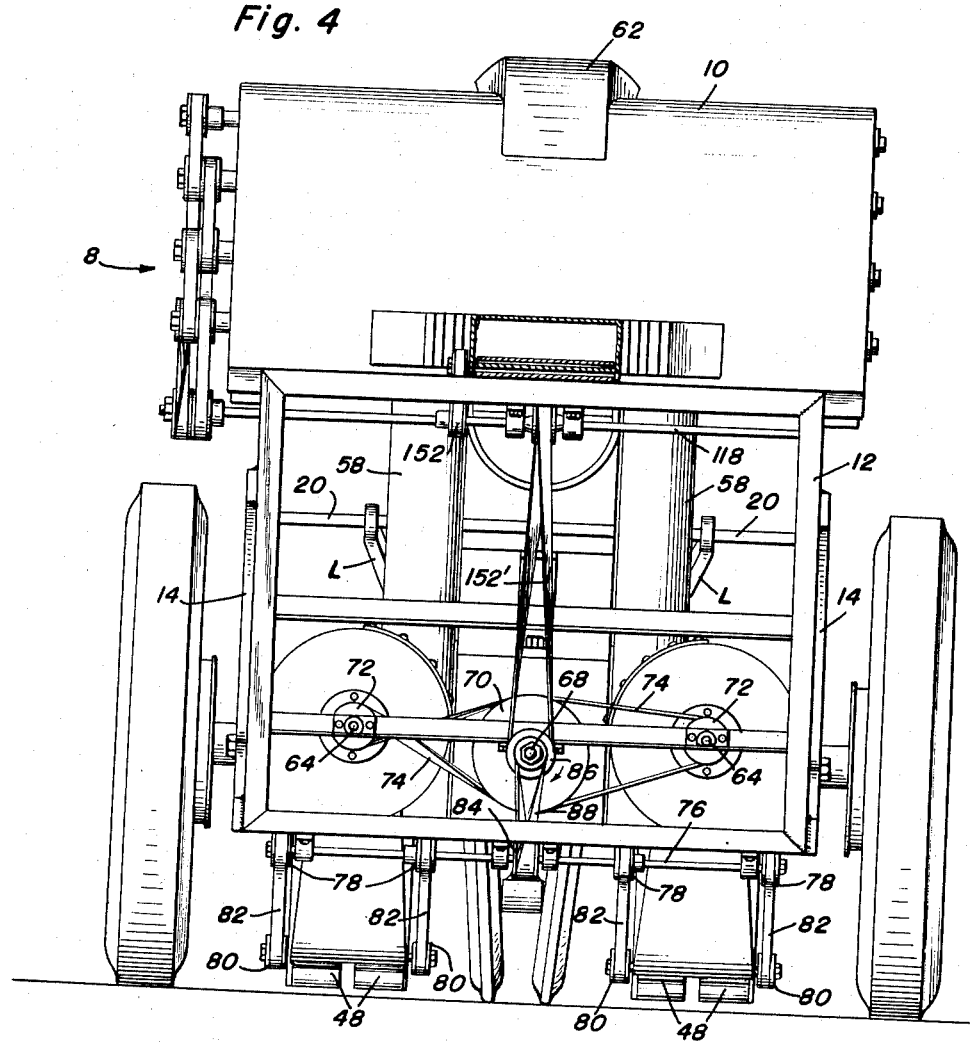
Figure 4 is a rear view of the invention mounted on a tractor.

Referring now to the drawings in detail, wherein for the purpose of illustration, is disclosed a preferred embodiment of the present invention, the numeral 10 represents a housing member that is suitably fixed to the upper portion of an open box-like framework 12 of preferably angle iron construction.

The framework 12 includes, at each side, a pair of forwardly converging straps forming a V-member 14. The apices of the V-members 14 project forwardly of the framework 12 proper and are pivoted to ears 16 extending from clamps 18 and the clamps 18 will embrace and grip the rear axle A of a conventional tractor T. The lift arms L of the tractor are pivotally connected to a shaft 20 mounted in bearings 22 on the framework 12.

A pair of trough members 24 are supported in side by side relationship on the sides of the tractor T and extend longitudinally of the tractor and forwardly from the framework 12. Each of the trough members includes an open bottom and a pair of side walls 26 and 28 that may be adjusted toward and away from each other.

Figure 5:
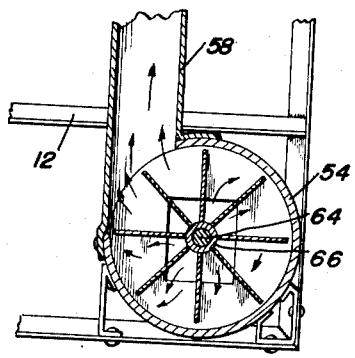
Figure 5 is a vertical sectional view taken substantially on the plane of section line 7—7 of Figure 1.

Inverted U-shaped members or yokes 30 are removably secured by fasteners or brackets to the sides of the tractor T and the members 30 embrace the trough members 24, as shown best in Figures 5 and 6. The lower ends 32 of the members 30 are adjustably secured to blocks 34 fixed to walls 26 and 28 through the medium of bolts 36 that are received in slots in the ends 32.

The forward ends of the walls 26 and 28 are bent into concavo-convexed throat forming portions 40 and the walls 26 and 28 are reinforced and strengthened by straps 42 welded to the inner faces of the walls 26 and 28. The strippers are mounted within each trough member 24 as hereinafter described.

A rear horizontal driven roller 44 is rotatably supported at the rear end of each of the walls 26 and 28, and a forward horizontal idler roller 46 is rotatably supported adjacent the forward end of each of the walls 26 and 28. An endless conveyor 48 is trained about the rollers 46 and 48 of each wall 26 and 28, whereby each of the trough members will have two endless conveyors therein that are spaced parallel to each other and which extend longitudinally of the trough members.

The rear ends of the trough members are provided with discharge sleeves 50 that are coupled to the intake conduits 52 of fan housings 54 by bellows-like members 56. The housings 54 are supported by the framework 12 and include outlet openings in their upper walls in which the branches 58 of a tubular Y-shaped conduit 60 are suitably held. The body portion 62 of conduit 60 enters the top of the housing member 10, as shown best in Figure 3.

The framework 12 rotatably supports a pair of parallel shafts 64 that extend longitudinally of the trough members and which shafts include forward ends that extend into the housings 54 to support fans or bladed members 66 that will direct material entering housings 54 upwardly through conduit 60 and into housing member 10, as illustrated best in Figure 7.

A central longitudinal shaft 68 is rotatably supported in bearings on the framework 10 and its forward end is coupled to the power take-off shaft S of the tractor. Pulleys 70 on the shaft 68 are connected to pulleys 72 on the shafts 64 by endless pulley belts 74 the belt to one of the pulleys 72 being twisted, whereby the members 66 will be driven by the power take-off shaft of the tractor.

A transverse shaft 76 is rotatably supported in bearings depending from framework 12 and carries pulleys 78 that are connected to pulleys 80 on the rollers 44 by belts 82. The shaft 76 also supports a pulley 84 that is connected to a pulley 86 on the shaft 68 by a partially twisted belt 88.

Means is provided within the housing member 10 for processing cotton entering the housing member prior to the passage of the cotton from the outlet 90 of the housing member and the burrs and trash through the outlet opening 92 in the bottom wall of the housing member. This means comprises a plurality of vertically spaced horizontally disposed cleaner brushes 94 having supporting shafts 96 that are journaled in suitable bearings on the side walls of the housing member. The shafts 96 project outwardly from one side wall of the housing member and support pulleys 98.

A plurality of vertically spaced horizontally disposed toothed members or sawing rollers 100 are positioned in side by side relation with and in front of the brushes 94 and include supporting shafts 102 journaled in bearings on the side walls of the housing member 10. One end of each shaft 102 projects from one side wall of the housing member 10 and these exposed ends of shafts 102 support pulleys 104.

A plurality of vertically spaced horizontally disposed burr and trash extracting rollers or toothed cylinders or strippers 106 are located in the housing member in side by side relation with the rollers 100 and in front of the rollers 100. The supporting shafts 108 for the rollers 106 each includes an end that projects outwardly from a side wall of the housing member 10 to support a pulley 110.

One end of the supporting shaft 112 of a spider-like member or toothed roller or fan 114 which may be termed a beater or fluffer disposed horizontally over the uppermost of the rollers 100 projects from the same side wall of member 10 as the shafts 96, 102 and 108, and carries a pulley 116.

A horizontal upper transverse shaft 118 is rotatably supported in bearings on the framework 12 and carries a group of pulleys 120 two of which are connected to the lowermost of the pulleys 98 and 104 by belts 122 and 124, the latter belt being twisted as shown in Figure 8.

Adjacent pulleys 98 are connected together by belts 126; adjacent pulleys 104 are connected together by belts 128 with the uppermost of pulleys 104 connected to pulley 116 by a belt 130; adjacent pulleys 110 are connected together by belts 132; and, the uppermost of the pulleys 110 is connected to pulley 116 by a belt 134. In this manner, the pulleys 104, 116 and 110 will rotate counterclockwise when viewing Figure 8 whereas pulleys 98 will rotate clockwise in Figure 8.

The rollers 106 are located above the outlet 92 and the upper two of the rollers 106 are embraced by U-shaped screens 136 whose lower legs extend past the central roller of the rollers 100. An arcuate screen 138 is located under the lowermost of the rollers 100. A pair of downwardly converging baffles 140 and 142 extend toward the upper of the rollers 100 from the top wall of housing member 10 and confine the member 114 therebetween. A screen 144 in the member 10 extends over the member 114 as shown in Figure 3.

An elevator conveyor 146 extends rearwardly from the outlet 90 and is provided with a covering 148 and a driven roller 150 that is connected by a drive connection 152 to shaft 118, said drive connection preferably comprising pulleys and a belt. Shaft 118 is connected by a drive connection 152' to the shaft 68.

In practical use of the present invention, as the tractor T moves forwardly, the cotton plants enter the trough members 24 via the stripper throats 60a, the cotton is stripped from the plants within said members and drops on conveyors 48 which elements are located in each trough member 24, and the conveyors convey the cotton to the housings 54.

The fans 66 impel the cotton upwardly through conduit 60 and into housing member 10 where the process of extracting fine trash from the cotton is accomplished by fan or spider member 114 throwing the cotton against screen 144. The fine trash is directed through the screen 144 by air entering member 10 by conduit 60 over screen 144 and passes toward outlet 90.

The cotton passes down hopper 140, 142 which blocks the incoming air and the cotton is sawed, brushed and combed to separate the burrs and heavy trash from the cotton. The burrs and trash will pass through screens 136 and then through outlet 92 where it will fall to the ground. The clean cotton will pass through the outlet 90 and since it is not machined it will be in a soft fluffy condition for ginning when it leaves the elevator.

Having described the invention, what is claimed as new is:

1. A cotton harvesting machine comprising stripping means for removing the cotton from the standing stalks, a cotton boll separating and cotton cleaning mechanism, means for conveying the cotton which has been removed from the stalks to said cotton boll separating and cotton cleaning mechanism, said cotton boll separating and cotton cleaning mechanism comprising: a plurality of rotary vertically arranged sawing means, a plurality of rotary vertically arranged brushes located on one side of said sawing means, a plurality of rotary vertically arranged strippers located on the opposite side of said sawing means from said brushes, said sawing means, brushes and strippers having parallel axes, a casing inclosing said sawing means, brushes and strippers, a combined rotary beater and fluffer means located between said conveyor means and said sawing means whereby said cotton is beaten and fluffed before being acted upon by said sawing means, brushes and strippers, means for simultaneously rotating said beater and fluffer means, sawing means, brushes and strippers, screen means located closely adjacent to said strippers within said casing, whereby burrs and trash may pass through said screen means, said casing having an outlet for said burrs and trash, and a separate outlet for said cleaned cotton.

2. The combination set forth in claim 1 wherein there are converging baffles located between said beater and fluffer means, and said rotary saw means.

3. The combination set forth in claim 1 wherein said rotary saw means comprises a plurality of sawing rollers.

4. The combination set forth in claim 1 wherein said screen means is located closely adjacent said strippers comprising U-shaped screens mounted on the opposite sides of said strippers from said saw means.

5. The combination set forth in claim 4 wherein there is a second screen means comprising an arcuate screen located under the lowermost of said sawing rollers and within said casing.

6. The combination set forth in claim 4 wherein there is provided a third screen means located above said rotary beater and fluffer means whereby to extract fine trash from the cotton as the same is thrown against said third screen means by said rotary beater and fluffer means.

7. The combination set forth in claim 5 wherein there is provided a third screen means located above said rotary beater and fluffer means whereby to extract fine trash from the cotton as the same is thrown against said third screen means by said rotary beater and fluffer means.

FRANCIS M. WAGNON.

References Cited in the file of this patent

UNITED STATES PATENTS

| Number | Name | Date |
|---|---|---|
| 800,628 | Childress | Oct. 3, 1905 |
| 1,090,606 | Epps | Mar. 17, 1914 |
| 1,137,545 | Shaffer | Apr. 27, 1915 |
| 1,149,253 | Dickerson | Aug. 10, 1915 |
| 1,153,963 | Speck | Sept. 21, 1915 |
| 1,177,120 | Manners | Mar. 28, 1916 |
| 1,823,133 | Dalke | Sept. 15, 1931 |
| 2,001,078 | Court | May 14, 1935 |
| 2,001,079 | Court | May 14, 1935 |
| 2,064,394 | Thomann | Dec. 15, 1936 |
| 2,079,547 | Court | May 4, 1937 |
| 2,406,058 | Boone | Aug. 20, 1946 |
| 2,438,393 | Homner et al. | Mar. 23, 1948 |
| 2,493,422 | Sartin | Jan. 3, 1950 |
| 2,502,817 | Bennett | Apr. 4, 1950 |
| 2,532,065 | Hyman | Nov. 28, 1950 |
| 2,538,454 | Hart, Jr. | Jan. 16, 1951 |
| 2,560,974 | May | July 17, 1951 |
| 2,571,222 | Edwards | Oct. 16, 1951 |